(12) United States Patent
Wilson et al.

(10) Patent No.: US 7,765,132 B2
(45) Date of Patent: *Jul. 27, 2010

(54) TAX REFUND SYSTEM

(75) Inventors: Robert D. Wilson, Shawnee, KS (US); Mark A. Ernst, Mission Hills, KS (US)

(73) Assignee: H&R Block Tax Services, LLC, Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/626,677

(22) Filed: Jan. 24, 2007

(65) Prior Publication Data

US 2007/0136160 A1 Jun. 14, 2007

Related U.S. Application Data

(63) Continuation of application No. 09/354,870, filed on Jul. 16, 1999, now Pat. No. 7,177,829.

(51) Int. Cl.
*G07B 17/00* (2006.01)
*G07F 19/00* (2006.01)
*G06Q 20/00* (2006.01)
*G06Q 40/00* (2006.01)
*G06K 5/00* (2006.01)

(52) U.S. Cl. .................. 705/30; 705/18; 705/36 T; 705/39; 235/380

(58) Field of Classification Search ................ 705/30, 705/36 T, 18, 39; 235/380
See application file for complete search history.

(56) References Cited

U.S. PATENT DOCUMENTS 3,596,256 A 7/1971 Alpelt (Continued)

FOREIGN PATENT DOCUMENTS

WO   WO 98/04987   2/1998

(Continued)

OTHER PUBLICATIONS

Business Editors, Minolta Offers Instant Rebates On Full Line of Color Pageworks Laser Printers; Resellers Benefit from Minolta's Most Aggressive Pricing Ever, Oct. 1, 1998, Business Wire, p. 1.*

(Continued)

*Primary Examiner*—Matthew S Gart
*Assistant Examiner*—Ig T An
(74) *Attorney, Agent, or Firm*—Stanley Law Group LLP

(57) ABSTRACT

A tax refund system is disclosed in which in exchange for a taxpayer assigning all or a portion of his or her tax refund, a participating provider provides to the taxpayer a spending vehicle with buying power at participating outlets. Tax return data for an individual's tax return is processed by the IRS. A taxpayer consents to using a portion of the tax return data to acquire a spending vehicle from a financial institution of the taxpayer's choosing. Using a portion of the tax return data, the IRS arranges to electronically transfer an amount related to the taxpayer's refund to an account at the financial institution selected by the taxpayer. A taxpayer then receives a spending vehicle such as a credit, debit, or cash card, spending account, coupon, or rebate from a financial institution or other spending vehicle provider such as a retailer, service provider, wholesaler, distributor, or entertainment entity.

19 Claims, 4 Drawing Sheets

U.S. PATENT DOCUMENTS

| | | | |
|---|---|---|---|
| 4,718,009 A | | 1/1988 | Cuervo |
| 4,890,228 A | | 12/1989 | Longfield |
| 5,025,138 A | | 6/1991 | Cuervo |
| 5,025,372 A | * | 6/1991 | Burton et al. .................. 705/14 |
| 5,138,549 A | | 8/1992 | Bern |
| 5,193,057 A | * | 3/1993 | Longfield ..................... 705/31 |
| 5,206,803 A | | 4/1993 | Vitagliano et al. |
| 5,394,487 A | | 2/1995 | Burger et al. |
| 5,420,926 A | | 5/1995 | Low et al. |
| 5,536,045 A | | 7/1996 | Adams |
| 5,644,727 A | | 7/1997 | Atkins |
| 5,724,523 A | * | 3/1998 | Longfield ..................... 705/39 |
| 5,739,512 A | | 4/1998 | Tognazzini |
| 5,745,706 A | | 4/1998 | Wolfberg et al. |
| 5,772,251 A | | 6/1998 | Fleck |
| 5,787,404 A | * | 7/1998 | Fernandez-Holmann ..... 705/35 |
| 5,787,405 A | | 7/1998 | Gregory |
| 5,878,405 A | * | 3/1999 | Grant et al. ................... 705/39 |
| 5,903,876 A | * | 5/1999 | Hagemier ..................... 705/19 |
| 5,926,800 A | | 7/1999 | Baronowski et al. |
| 5,946,668 A | | 8/1999 | George |
| 5,963,921 A | * | 10/1999 | Longfield ..................... 705/31 |
| 5,991,736 A | | 11/1999 | Ferguson et al. |
| 5,991,744 A | | 11/1999 | DiCresce |
| 6,003,016 A | * | 12/1999 | Hagemier ..................... 705/19 |
| 6,019,283 A | | 2/2000 | Lucero |
| 6,064,983 A | | 5/2000 | Koehler |
| 6,070,153 A | | 5/2000 | Simpson |
| 6,105,007 A | | 8/2000 | Norris |
| 6,105,865 A | | 8/2000 | Hardesty |
| 6,182,891 B1 | | 2/2001 | Furuhashi |
| 6,185,683 B1 | * | 2/2001 | Ginter et al. ................ 713/176 |
| 6,202,052 B1 | * | 3/2001 | Miller ......................... 705/31 |
| 6,347,305 B1 | | 2/2002 | Watkins |
| 6,405,182 B1 | * | 6/2002 | Cuervo ........................ 705/43 |
| 6,473,500 B1 | | 10/2002 | Risafi et al. |
| 6,473,741 B1 | | 10/2002 | Baker |
| 6,532,450 B1 | | 3/2003 | Brown et al. |
| 6,546,373 B1 | * | 4/2003 | Cerra .......................... 705/19 |
| 6,625,582 B2 | | 9/2003 | Richman et al. |
| 6,829,588 B1 | | 12/2004 | Stoutenburg et al. |
| 7,010,507 B1 | | 3/2006 | Anderson et al. |
| 7,072,862 B1 | | 7/2006 | Wilson |
| 7,117,172 B1 | * | 10/2006 | Black .......................... 705/35 |
| 7,127,425 B1 | | 10/2006 | Wilson |
| 2002/0046110 A1 | * | 4/2002 | Gallagher ..................... 705/14 |
| 2003/0167225 A1 | * | 9/2003 | Adams ......................... 705/38 |
| 2004/0199422 A1 | * | 10/2004 | Napier et al. ................. 705/14 |
| 2007/0050277 A1 | | 3/2007 | Wilson |

FOREIGN PATENT DOCUMENTS

| | | |
|---|---|---|
| WO | WO 00/22494 | 4/2000 |
| WO | WO 00/42583 | 7/2000 |
| WO | WO 01/15031 | 3/2001 |
| WO | WO 01/39077 | 5/2001 |

OTHER PUBLICATIONS

Business Editors, Minolta Offers Instant Rebates On Full Line of Color Pageworks Laser Printers; Resellers Benefit from Minolta's Most Aggressive Pricing Ever, Oct. 1, 1998, Business Wire, p. 1.*
A Summary of the Roundtable Discussion on Stored-Value Cards and Other Prepaid Products, Fed. Res. Board, http://federalreserve.gov/paymentsystems/storedvalue/, last updated Jan. 12, 2005.
All for one—but not yet one for all, Loc. Gov't it Use, Mar./Apr. 1999, at 17.
Amended and Restated Refund Anticipation Loan Participation Agreement, Jan. 2003, available at: http://contracts.onecle.com/hrblock/household.loan.2003 .0 1.06.shtmi.
AM-TAX Professional 1040, Accounting Technology, Oct. 1998 at 30.
Christoslav Anguelov et al., U.S. Consumers and Electronic Banking: 1995-2003, Fed. Res. Bull., Winter 2004, at 1-18.
Antoinette Alexander, The Internet Rules Tax Filing Season, Acct. Tech., Jan./Feb. 2000, at 52.
Joanne Ball Artis, Fees for Speedy Tax Refunds Decried for High Interest Rate Tax Filing Firm Defends Practice as a Favor to Consumer, Boston Globe, Feb. 17, 1993, at 7.
Bank Card Report: POS: Is the Future Now?, ABA Banking J., Sep. 1986, at 66.
Bank machine benefits offer, Gov't Computing, Dec. 1998, at 8.
Michael S. Barr, Banking the Poor (Univ. Mich. Law Sch., Working Paper No. 49, 2004).
Matt Barthel, Star's Explore Unit Merging With Cactus POS Network, Am. Banker, Mar. 11, 1994, at 1.
Jennifer Bayot, For Some Taxpayers the Refund is in the Plastic, N.Y. Times, Feb. 1, 2004, at BU8.
*Beckett v. H&R Block, Inc.*, No. 94-C-776, 1994 WL 698505 (N.D. III. Dec. 12, 1994).
Eamon Beltran, H&R Block to Enhance Tax, Financial Services, Dow Jones News Service, Nov. 17, 1999.
Tom Bengston, W. Union Reaches the Unbanked with Quick Cash, N. W. Fin. Rev., Jun. 27, 1998, available at http://findarticles.comlp/articles/mtqa3799/is_199806/ai_n87953 75/print?tag=artBody;c011.
Alan Berube et al., The Price of Paying Taxes: How Tax Preparation and Refund Loan Fees Erode the Benefits of EITC, The Brookings Inst., Progressive Policy Inst., May 2002, available at http://www.brookings.edu/reports/2002/05taxes_eitc.aspx.
Sondra G. Beverly and Coleen Dailey, Using Tax Refunds to Promote Asset Building in Low-Income Households: Program and Policy Options, Center for Soc. Dev., George Warren Brown School of Soc. Work, Wash. D., Oct. 2003, available at http://gwbweb.vvustl.edu/csd/Publications/2003/PolicyReport-TaxRefund.pdf.
Joseph Bondar, Social Security Beneficiaries Enrolled in the Direct Deposit Program, Dec. 1996, Aug. 1998, at 52.
Bill Brandel, Micro-To-Host Links: Data Link Speeds Tax Filing, Refunds, Computerworld, Mar. 28, 1988, at S7.
Lynn Brenner, NY Thrift Promotes Tax Services Dollar Dry Dock Offers Refund in Advance of IRS Payment, Am. Banker, Feb. 2, 1989, at 10.
Scott Bronstein, A Check-Writing Nation Ignores the Debit Card, N.Y. Times, Oct. 6, 1985 § 3, at 12.
Amy Brown et al., Refund Loan Products and VITA: A Summary of Issues and Options, Nov. 2004, http://www.responsiblelending.orgIpdfs/RALs-Summary-1104.pdf.
Jim Brown, Ways to Pay, Network World, Aug. 29, 1988, at 29.
Businesswire, Sweepstakes and Free Refund Estimation Highlight SecureTax Incentives, Jan. 13, 1998.
Carbiz.com Inc., Annual Report, Form 20-F SEC Filing (Jan. 31, 2000).
Carbiz.com Acquires Tax Max Service Group Inc., Carbiz.com Inc., Apr. 25, 2000, http://www.carbiz.comIShowRelease.asp?RecordID=43.
Carbiz. com Acquires Tax Max Service Group Inc., The Auto Channel, Apr. 25, 2000, http://www.theautochannel.com/news/press/date/20000425/pressO13905.html.
CashMoney®, http://www.cashmoney.ca/main.html (last visited Nov. 10, 2008).
Brian Cayton, Low-Cost Software Open New Windows On Financial Planning, Accounting Technology, Jul. 1996.
Cendant's Juggernaut: The Growth of the World's Largest Real Estate Company, Oct. 11, 1997, available at http://74.I25.45.I04/search?q=cache:nn_KrnE45prcJ:www.remaxcahi.com/esource/franchisee/forms/cendant.pdf+%E2%80%A2+Cendant%E2%80%99s+Juggernaut,+Oct.+11,+1997&hl=en&ct=cInk&cd=1&gI=us.
Julia S. Cheney, Payment Cards and the Unbanked: Prospects and Challenges, Fed. Res. Bank Philadelphia, Jul. 13-14, 2005, available at http://www.philadelphiafed.org/payment-cardscenter/events/conferences/2005/PaymentCardsandtheUnbankedSummary.pdf.
Julia S. Cheney, Prepaid Card Models: A Study in Diversity, Fed. Res. Bank Philadelphia, Mar. 2005, available at http://www.

philadelphiafed.org/payment-cardscenter/publications/discussion-papers/2005/PrepaidCardModels_Palmer_FINAL.pdf.

Citibank Joins Efforts to Assist 'Unbanked', Bank Tech. News, Jan. 1999, at 23.

Paul Clolery, H&R Block Tests Mastercard; AICPA's New Card Adds Benefits, Prac. Acct., May 1993, at 10.

Steve Cocheo, Beneficial parentage, ABA Banking J., Jul. 1997, at 44.

Michael Cohn, Linking Planning to Tax Prep, Accounting Technology, Feb./Mar. 1997, at 49-56.

Michael Cohn, Tax Prep Software 1040 Tax Prep Update, Accounting Technology, Feb. 1995, at 27-34.

Shawn Allen Cole et al., Where Does It Go? Spending by the Financially Constrained (Harv. Bus. Sch. Fin., Working Paper No. 08-083, Apr. 11, 2008).

*Colorado* v. *Cash Now Store, Inc.*, 12 P.3d 321 (Colo. Ct. App. 2000).

Consultation Paper on Framework Options for Addressing Concerns with the Alternative Consumer Credit Market, ACCM Working Group, Consumer Measures Committee, Autumn 2002, available at http://cmcweb.ca/epic/site/cmccrmc.nsf/vwapj/CMC_credit_e.pdf/$FILE/CMC_credit_e.pdf.

Consumer Action News: EBT/EFT Update (1998), Jul. 1, 1998, http://www.consumeraction.org/news/articles/ebt_eft_update_1998/.

Antoinette Coulton, Nations Bank Testing Visa Cash at Air Force Base, Am. Banker, Jul. 15, 1998, at 13.

Council plans bank machine pay-outs, Gov't Computing, Feb. 1999, at 5.

Eileen Courter, Debit Cards Come of Age, Credit Union Mgmt., Feb. 1996, at 36.

Debit Payoff, Card Fax, Nov. 13, 1998, at 2.

Paul Demery, Tax Planning Draws a Crowd—Tax Software Vendors Compete in What Was Once a One-Horse Race, Accounting Technology, Dec. 1998.

Dey Delrio and Chris Kelley, A Primer on Fringe Products Associated with RALs, Nov. 2004, http://www.responsiblelending.org/issus/refund/briefs/.

Ryan Donmeyer, IRS Takes Aim at RAL Fraud, Hits Return Preparer Profits, 66 Tax Notes 1088 (Feb. 20, 1995).

Daniel Dunaief, Mellon Leads $1.25B Loan to Underpin H&R Block's Tax Refund Loand Program, Am. Banker, Nov. 7, 1996, at 20.

Electronic Tax filing: fast track to fraud?, Bank Tech. News, Sep. 1995, at 6.

Electronic Transfer Account: Frequently Asked Questions, http://www.etafind.gov/ETAFactsPage5.cfm.

Electronic Transfers: Use by Federal Payment Recipients Has Increased but Obstacles to Greater Participation Remain: General Accounting Office Rep. to the Subcomm. on Oversight and Investigations ofthe H Comm. on Financial Services, GAO-02-913 (Sep. 2002).

Gregory Elliehausen, Consumer Use of Tax Refund Anticipation Loans (Geo. U., Credit Res. Center, Monograph #37, Apr. 2005).

FastFile's Car Dealer Program Details, http://web.archive.org/web/20011214130849/www.fastfile.com/car/progDetails.html (Dec. 14, 2001).

FastFile's Manufactured Housing Program Details, http://web.archive.org/web/20020208132040/www.fastfile.com/manHouse/progDetails.html (Feb. 8, 2002).

Nancy Ferris, Embracing Electronic Commerce, Gov't Executive, Jan. 1998, at 49.

The Financial Post Company, The Financial Post Guide to Investing & Personal Finance: Retirement Planning, Mar. 14, 1998.

Paul Finch & Ray Haynes, Research Isolates Deposit Gains from EFT Technology, Bank Sys. & Equipment., Mar. 1988, at 58.

First Data Corp., Annual Report, at 4, 20 (1998).

Food Stamp Electronic Benefit Transfer Systems: U.S. Dept. Agriculture Rep. to the H Comm. on Agriculture and the S. Comm. on Agriculture, Nutrition, and Forestry (Oct. 2003), available at http://www.fns.usda.gov/FSP/ebt/pdfs/2003_congress.pdf, last updated Jun. 23, 2009.

Food Stamp Program: Frequently Asked Questions About FTP, http://www.fns.usda.gov/fsp/ebt/FAQ.htm.

John R. Galvin, Banc One Corp., Testimony Before the Nat'l Comm'n on Restructuring the I.R.S. (Jan. 30, 1997), available at http://www.house.gov/natcommirs/galvin.htm.

Harold C. Gellis, How to Get Plugged Into Electronic Tax Filing, 1. Accountancy, Jun. 1991, at 56.

Lisbeth K. Green, Payroll Cards: How and Why to Make Them Work For Your Organization, Paytech, Mar. 12, 2002, at 16.

*Green* v. *H&R Block, Inc.*, 735 A.2d 1039 (Md. 1998).

George Guttman, Electronic Filing: Who Pays, Who Benefits, 66 Tax Notes 1750 (Mar. 20, 1995).

Mike Hogan, Drat! It's Tax Time Again, PC World Online, Dec. 17, 1999, at 1.

*Household Bank* v. *JFS Group*, 320 F.3d 1249 (11 th Cir. 2003).

Karen Hube, A Special Summary and Forecast of Federal and State Tax Developments, Wall Street J., Dec. 29, 1999, at AI.

Internal Revenue Service Res. Div., Specifications for Direct Deposit of Individual Income Tax Refunds (Oct. 15, 1986).

Internal Revenue Service Res. Div., Specifications for Electronic Filing of Income Tax Returns (Oct. 15, 1986).

Interpretations—Jan. 1 to Mar. 31, 2002, Off. Comptroller Currency Q. J., Jun. 2003, at 115.

IRS Refund Glitch Sees Banks Stiffed, Associated Press, Feb. 6, 1992, available at http://www.ap.org.

Kelly Jackson, Transmit It To The IRS, Communications Week, Apr. 2, 1990, at 8.

Katy Jacob et al., Stored Value Cards: Challenges and Opportunities for Reaching Emerging Market, Fed. Res. Board, 2005 Res. Conf., available at http://www.ny.frb.orgIregional/svc_em.pdf.

David Cay Johnston, Beneficial Sues Over Who Gets IRS Refunds, Oregonian, Feb. 22, 1995, at D2.

David Cay Johnston, Company News; Bank Challenges IR.S. on Refunds for Borrowers, N.Y. Times, Feb. 22, 1995.

Judge Advoc. Gen.'s Sch., Consumer Law Guide, Ch. 6 (Oct. 9, 2003) available at http://web.archive.orgIweb/20031009214055/http://www.louisvillelaw.com/federaVArmyPubs/JA+265+–Consumer+Law+Deskbook+(2000).pdf.

Ajit Kambil and James E. Short, Electronic Integgration and Business Network Redesign: A Roles-Linkage Perspective, J. Mgmt. Info., Spring 1994, at 59.

Howard Karger, America's Growing Fringe Economy, Dollars & Sense Magazine, Nov./Dec. 2006.

Jacob Katy, Stored Value Cards: A Scan of Current Trends and Future Opportunities (Center Fin. Services Innovation, Research Series White Paper No. 1, Jul. 2004).

Charles Keenan, Citi to Issue Debit Cards Through Check Cashers, Am. Banker, Jan. 19, 1999, at 18.

Ted Kemp, Discover Debuts It's First Platinum Card, DMNEWS, Jan. 4, 1999, at 2.

Lenna D. Kennedy, OASDI Beneficiaries and SSI Recipients With Representative Payees, Soc. Security Bull., Winter 1995, at 115.

Andrew Kitching and Sheena Starky, Payday Loan Companies in Canada: Determining the Public Interest, Parliamentary Info. Res. Service, Jan. 26, 2006, available at http://www.parl.gc.ca/information/library/PRBpubs/prb0581-e.html.

James R. Kraus, Beneficial's Tax Refund Lending Program Seen as On-Course After Pullout from Earned Income Side, Am. Banker, Mar. 8, 1995.

Victor Kremer, Finance Co. Readies First Lottery Bonds, Bondweek, Apr. 13, 1998, at 1.

Jeffrey Kutler, Chevron to Take Debit Cards by '92 at Service Stations, Am. Banker, Sep. 7, 1988, at 12.

Jeffrey Kutler, Explore-Cactus Deal is Crowing Glory for Pioneer in Electronic Funds Transfer, Am. Banker, Mar. 11, 1994, at 15.

Jeffrey Kutler, TV Expedites Validation of Visa Charges, Am. Banker, Jul. 20, 1988, at 1.

Letter from Thomas M. Bloch, H&R Block, Inc. to Bernie Radack, Internal Revenue Servo (Mar. 31, 1999).

Diane E. Lewis, It's All in the Card: For Some Employers, Papers is Giving Way to Plastic on Payday, Boston Globe, Feb. 15, 2004.

M2 Presswire, Microsoft: Microsoft Teams With SecureTax. com to Provide Electronic Tax Filing on MSN MoneyCentral, Feb. 19, 1999.

Michael F. Lynch, The Age of Electronic Filing, J. Acct., Nov. 1993, at 30.

Gene G. Marcial, Watch Out, H&R Block, Inside Wall Street, Businessweek Online, Nov. 10, 1997.
Steven Marjanovic, Arizona Clearing House Chief Eyes Expansion, Am. Banker, Aug. 18, 1995, at 16.
Laura Lou Meadows, Electronic Filing Speeds Refunds, N.Y. Times, Mar. 5, 1989, § 3, at 27.
Gene Meyer, Block Joins IRS Program to Cut Costs of Fast Refunds: Debt Indicator Will Also Be a Tool in Fighting Fraud, Kansas City Star, Nov. 18, 1999.
Gene Meyer, H&R Block Joins IR.S. Program That May Trim Cost of Quick Refunds, Kansas City Star, Nov. 18, 1999.
Ware Myers, On Trial at the Summer Olympics: Smart Cards, Computer, Jul. 1996, at 88.
Timothy J. Mullaney, IR.S. Fraud Watch Cuts Refund Loans, Baltimore Sun, Mar. 12, 1995, at ID.
NaCCA Announces New Debit Card Program, Bus. Wire, Jan. 11, 1999, available at http://www.businesswire.com.
NaCCA, Citigroup Target "Unbanked", Bank Sys. & Tech., Mar. 1999, at 10.
Nat'l Taxpayer Advocate, 2007 Objectives Report to Congress: vol II—The Role of the IRS in the Refund Anticipation Loan Industry, Jun. 20, 2006, available at http://www.irs.gov/pub/irs-utl/nta_fy07_final_objectives_report_071206.pdf.
No. 1 Rated TaxCut Software for the 1999 Tax Year Ships to Retail Stores, Bus. Wire, Dec. 6, 1999, available athttp://www.businesswire.com.
Terrence O'Hara, Santa Barbara Bank Decides to Rethink its Refund Anticipation Loan Business, Am. Banker, Jun. 23, 1995, at 6.
Pacific Capital Bancorp, Form 10-Q SEC Filing (May 17, 1999).
Pacific Capital Bancorp, Inc., Form 10-Q SEC Filing (Nov. 15, 1999).
Kelly Palmer, Local Firm Offers Instant Tax Returns, Springfield Bus. J., Jan. 22, 1990, at 1.
James F. Peterson & Keith A. Washington, Why Electronic Tax Filing is Hot, J. Acct., Oct. 1993, at 68.
Jim Peterson, Get with the program! The IRS Elf, Nat'l Pub. Acct., Nov. 1993, at 42.
Maureen Pirog et al., The Expanding Role & Efficacy of E-Government Innovations in US Social Services (Higher Sch. of Econ., Moscow, Russ., Apr. 2007).
Travis Plunkett, Legislative Dir. Consumer Fed'n of Am., Remarks Before the Senate Comm. on Banking, Housing and Urban Affairs: An Examination of the Gramm Leach Bliley Act Five Years After Its Passage (Jul. 13, 2004).
Marcus Pollet, New plans on the cards, Gov't Computing, Oct. 1996, at 8.
Theodore Postel, Lottery Prize: Assignment of Benefits, Chi. Daily L. Bull., Dec. 19, 1995, at 1.
Press Release, Employee Solutions, Inc., Employee Solutions Partners with Bank One; Plan for a Debit Card Announced (Nov. 12, 1998) (PR Newswire Assoc. Inc.).
Press Release, First Data Corporation, CSRG is First National User of NTS Debit Card for Remote and 'Unbanked' Employees (Aug. 15, 1997) (PR Newswire Assoc. Inc.).
Press Release, H&R Block Inc., H&R Block Tests Low-Rate Credit Card in Select Markets (Mar. 4, 1993) (PR Newswire Assoc. Inc.).
Press Release, H&R Block Inc., H&R Block to Offer Internet Tax Preparation and Electronic Filing at hrblock.com (Nov. 22, 1999) (PR Newswire Assoc. Inc.).
Press Release, Woodbridge Sterling Capital, LLC, Woodbridge Sterling Capital to Issue Securities Backed by Cash Flows From Lottery (Jul. 31, 1997) (PR Newswire Assoc. Inc.).
PR Newswire, Yahoo! Finance Unveils Tax Center, Feb. 1, 1999.
Program Overview—Bank One Visa Cash Cards, http://www.visacash.orgfbankone.html (last visited Nov. 11, 2008).
Bruce Purple, Beneficial National Bank Launches in-Branch Tax Service for Quick refund, Bus. Wire, Jan. 16, 1992, available at http://www.businesswire.com.
Jane Bryant Quinn, Borrowing is Expensive Way to Get Tax Refund Money Fast, Baltimore Sun, Feb. 23, 1998, at 13C.
Jane Bryant Quinn, Separating Fact From Fiction on Federal Checks and Direct Deposit, Wash. Post, Jun. 6, 1999, at H2.
Kristina Rasmussen, From Government's Coffers to Our Wallets: Why Americans Need Choices in Tax Refund Delivery Services (Nat'l Taxpayer's Union, Issue Brief No. 163, Apr. 16, 2007), available at http://www.ntu.org/main/pressJssuebriefs-.printable.php-?PressID=924&org_name=NTU.
Refund Anticipation Loans: Before the Subcomm. on Consumer Credit and Insurance of the H Comm. on Banking, Finance and Urban Affairs, 103rd Congress (1994).
Request to Reopen and Modify Consent Order, In the Matter of Beneficial Corporation, et al., No. D-8922 (F.T.C. May 27, 1986).
Sherris L. Rhine et al., Householder Response to the Earned Income Tax Credit: Path to Sustenance of Road to Asset Building (Fed. Res. Bank N.Y, 2005), available at http://www.chicagofed.orgIcedric/promises-'pitfalls_2005_conference_session2.cfm.
Howard Rudnitsky, Tax Play, Forbes, May 11, 1992, at 48.
Sainsbury Reward Card Extended to More Third Party Retailers, Retail Rev., Jan. 1999, at 12.
Elizabeth R. Schiltz, The Amazing Elastic, Ever-Expanding Exportation Doctrine and Its Effect on Predatory Lending Regulation, 88 Minn. L. Rev. 525 (Feb. 2004).
Robert W. Scott, E-Filing Vendors Outraged Over Death of DDI, Acct. Today, Nov. 21, 1994, at 1.
*Silver v. H&R Block, Inc.*, 105 F.3d 394 (8th Cir. 1997).
Peter Skillern and Adam Rust, The High Cost of Refund Anticipation Loans in North Carolina, Cmty. Reinvestment Ass'n of N.C. (Jan. 25, 2007), available at http://www.ncimed.com/docs/2006_RALReport.pdf.
Slow roll out, and still thin on the ground, Gov't Computing, Jan. 1999, at 24.
Smart City, Gov't Computing, Sep. 1999, at 10.
Social Security Beneficiaries Enrolled in the Direct Deposit Program, Dec. 1996, Soc., Soc. Security Bull., Jan. 1998, at 52.
State Recognition of Paycards (Am. Payroll Assoc., Feb. 2008).
Michael A. Stegman et al., The State of Electronic Benefit Transfer (EBT) (Dec. 2003) (on file with Center for Community Capitalism: The University of North Carolina at Chapel Hill).
Beth Stetenfeld, The Power of Electronic Tax Filing, Credit Union Mgmt., Oct. 1993, at 32.
Lewis Taub, Is Electronic Filing for You?, Small Bus. Rep., Jan. 1994, at 63.
Tax Max Service Group Inc., TaxMax Auto Dealer Electronic Filing System: 200112002 Tax Season Reference Guide (Revised Sep. 26, 2001).
Tax Refund Services About Us, http://web.archive.org/web/20010815215505/www.taxrefundservices.com/aboutus.htm (Aug. 15, 2001).
Tax Refund Services Car Dealerships, http://web.archive.org/web/20011216094735/www.taxrefundservices.com/cardealerships.htm (Dec. 16, 2001).
Tax Refund Services FAQ, http://web.archive.org/web/20010825032936/www.taxrefundservices.com/faq.htm (Aug. 25, 2001).
Tax Refund Services How It Works, http://web.archive.org/web/20010419201055/www.taxrefundservices.com/howitworks.htm (Apr. 19, 2001).
Tax Refund Services TRS Tax Marketing Program: Making It Easier to Buy a Car, Slide Show and Tax Marketing Agreement, http://web.archive.org/web/20010419201055/www.taxrefundservices.com/howitworks.htm (Apr. 19, 2001).
Tax Refunds for H&R Block Customers, Army Law, Aug. 1989, at 45.
TaxStar's Refund for Down Payment Program, http://dealers.taxstaronline.com, (last accessed Aug. 3, 2009).
TaxStar's Refund for Down Payment Program: Benefits of the Program, TaxStar Dealership Portal, http://dealers.taxstaronline.com/benefits.php (last accessed Aug. 3, 2009).
TaxStar's Tax Refund for Down Payment Program: The Process, TaxStar Dealership Portal, http://dealers.taxstaronline.com/process.php (last accessed Aug. 3, 2009).
Texas Capital Bank Launches New Payroll Platform, Bus. Wire, Nov. 12, 1999, available at http://www.businesswire.com.
The 2004 Federal Reserve Payments Study (Fed. Reserve Sys., Dec. 2004), available at http://www.frbservices.org/files/communications/pdf/research/2004PaymentResearchReport.pdf.

The Price of Loyalty—Safeway Raises the Stakes, Retail Rev., Apr. 1998, at 5.

*Turner* v. *Beneficial Nat'l Bank*, No. 98-c-2550, 2003 WL 24280981 (N.D. Ill. Sep. 10, 2003).

UK Government scraps benefit payment project, Electronic Gov't Int'l, Jun. 1999, at 1.

United States: First Data NTS launches innovative debit card, Electronic Payments Int'l, May 1997, at 3.

U.S. Trademark Appl. No. 75/309,970 (filed Jul. 22, 1999).

U.S. Trademark Appl. No. 78/199,430 (filed Jan. 2, 2003, first used in commerce Jan. 11, 2001).

Matthew Vadum, Company Cashes in on Lottery Bonanzas, Cent. Penn Bus. J., Apr. 17, 1998, at 4.

Mary Vanac, Florida Car Dealers Will Do Your Taxes, Let You Drive Home in Refund, Knight-Ridder Trib. Bus. News: Akron (Ohio) Beacon J., Mar. 5, 1999.

Virginia Men Implicated in Loan Scheme, Wash. Post, May 24, 1987, at B4.

VISA Taps IFS for Global Cash Card Pilots, Bus. Wire, May 5, 1997, available at http://www.businesswire.com.

Betsy Wade, Practical Traveler; V.A.T. Refunds: Vexations Added, N.Y. Times, Oct. 11, 1998, § 5, at 4.

Elspeth Wales, Marriages of convenience, Retail Sys., Sep. 1998, at 18.

Western Union Fin. Serv., Inc. & Basin Indus. Bank, Benefits Quick Cash Agreement and Disclosure Statement (Jun. 1, 1998).

Western Union Fin. Serv., Inc., Benefits Quick Cash Program: Answers, 1998.

Western Union Fin. Serv., Inc. & Basin Indus. Bank, Cash Card Agreement and Disclosure Statement (Sep. 1, 1998).

Western Union Fin. Serv., Inc., Federal Benefits Checks Are Going Away—Don't Let Your Customers Go With Them, 1998.

Western Union Fin. Serv., Inc., Newsbriefs (Spring 1990).

Western Union Fin. Serv., Inc., Only Western Union (product brochure).

Western Union Fin. Serv., Inc., Now When You Need Cash Reach for the Card, 1998.

Western Union Fin. Serv., Inc., Prepare Now for EBT and Keep Serving Your Customers, 1998.

In re: Western Union Interim Corp. (Fed. Deposit Ins. Corp. Jul. 7, 1998) (Order and Basis for Corporation Approval), available at http://www.fdic.gov/regulations/laws/bankdecisions/merger/westernunion.html.

Louis Whiteman, New Company Targets its Hybrid Debit Card to Unbanked Hispanics, Am. Banker, Jan. 22, 1999, at 6.

\* cited by examiner

_US 7,765,132 B2_

TAX REFUND SYSTEM

CROSS-REFERENCES TO RELATED APPLICATIONS

This application is a continuation of U.S. application Ser. No. 09/354,870 filed Jul. 16, 1999, now U.S. Pat. No. 7,177,829, issued Feb. 13, 2007.

BACKGROUND AND SUMMARY OF THE INVENTION

The present invention relates generally to a system for distributing tax refunds to taxpayers and, more particularly, to a system for allocating some or all of a taxpayer's tax refund into a spending vehicle. Taxpayer tax returns may be prepared in a number of different ways. For example, since relatively recently, taxpayers have been able to file their tax returns electronically. For example, the United States Internal Revenue Service (IRS) has an electronic filing system for taxpayers to file their tax returns. The IRS has the capability to provide refunds to the taxpayer through electronic funds transfer from the United States Treasury. Electronic filing (as well as other forms of filing) may enable a taxpayer to receive a direct deposit of his or her refund into an account at a bank or other financial institution.

In a typical situation today, the taxpayer has a few options available for preparing his or her tax return. One method is by visiting a local tax preparer's office (such as an H & R Block local office) and having a tax preparer prepare the taxpayer's return and/or file the return electronically from the third party preparer's office. Another method available to taxpayers is preparing their tax returns through a software package commercially available (such as the Kiplinger Tax Cut® software package). By using a commercially available software package a taxpayer is assisted in preparing his or her own return and may be able to file the return electronically with the IRS. Other methods of preparing tax return forms include self-preparation, telefiling (i.e., by phone), and the newest method which is through the use of an internet site which can assist the taxpayer in the preparation and possible electronic filing of his or her tax returns. The present invention preferably takes advantage of electronic filings but may be used in association with any method of tax return preparation and filing. A taxpayer for purposes of this disclosure is a person or other entity that has paid or is paying taxes to a taxing authority, and who may be entitled to a portion of those taxes paid to be returned to the taxpayer.

With the system of the present invention, a taxpayer's tax refund may be paid by electronic funds transfer to a taxpayer's account. In exchange for the assignment of the deposit of the tax refund amount by the taxpayer, the third party assignee provides a spending vehicle to the taxpayer. For example, a taxpayer may assign his or her tax refund to a retailer and in exchange for the right to receive the taxpayer's deposited refund. The retailer provides the taxpayer a spending vehicle such as a credit card or debit card with a predetermined amount of spending power for use at various outlets. The retailer spending vehicle may include an amount of buying power greater than the amount of the taxpayer's tax refund amount. For example, a retailer may issue a special debit card worth $500 in exchange for receiving the taxpayer's deposited refund of $450. The benefit to the retailer is that the taxpayer must spend his or her tax refund dollars at the retailer's store(s), and the benefit to the taxpayer may be that the retailer offers buying power at the retailer's store(s) in excess of the dollar amount of the taxpayer's refund.

The present invention is directed to receiving a spending vehicle in exchange for assigning all or a portion of a taxpayer's deposited tax refund amount. The present invention is different from prior systems in which the taxpayer has received a refund check, direct deposit to a bank or other financial institution account, or access to a loan amount in anticipation of receiving a tax refund, the amount of which is assigned to the lending institution. Under the system of the present invention, the spending vehicle is preferably provided to the taxpayer once the third party spending vehicle provider obtains the taxpayer's deposited refund or upon receiving assurance that the refund amount is accurate and forthcoming. Under the prior loan systems the taxpayer was required to enter into a loan agreement with a lending institution. Due to regulatory banking laws, these loan agreements could be lengthy and cumbersome. Under the system of the present invention, loan agreements are not necessary.

The present invention will be described in greater detail hereinafter. The present invention is described in the form of preferred embodiments and is not to be limited to those preferred embodiments but instead shall be given the broadest scope of protection affordable under the law in view of the allowed claims.

DETAILED DESCRIPTION OF PREFERRED EMBODIMENT(S)

Figure 2:
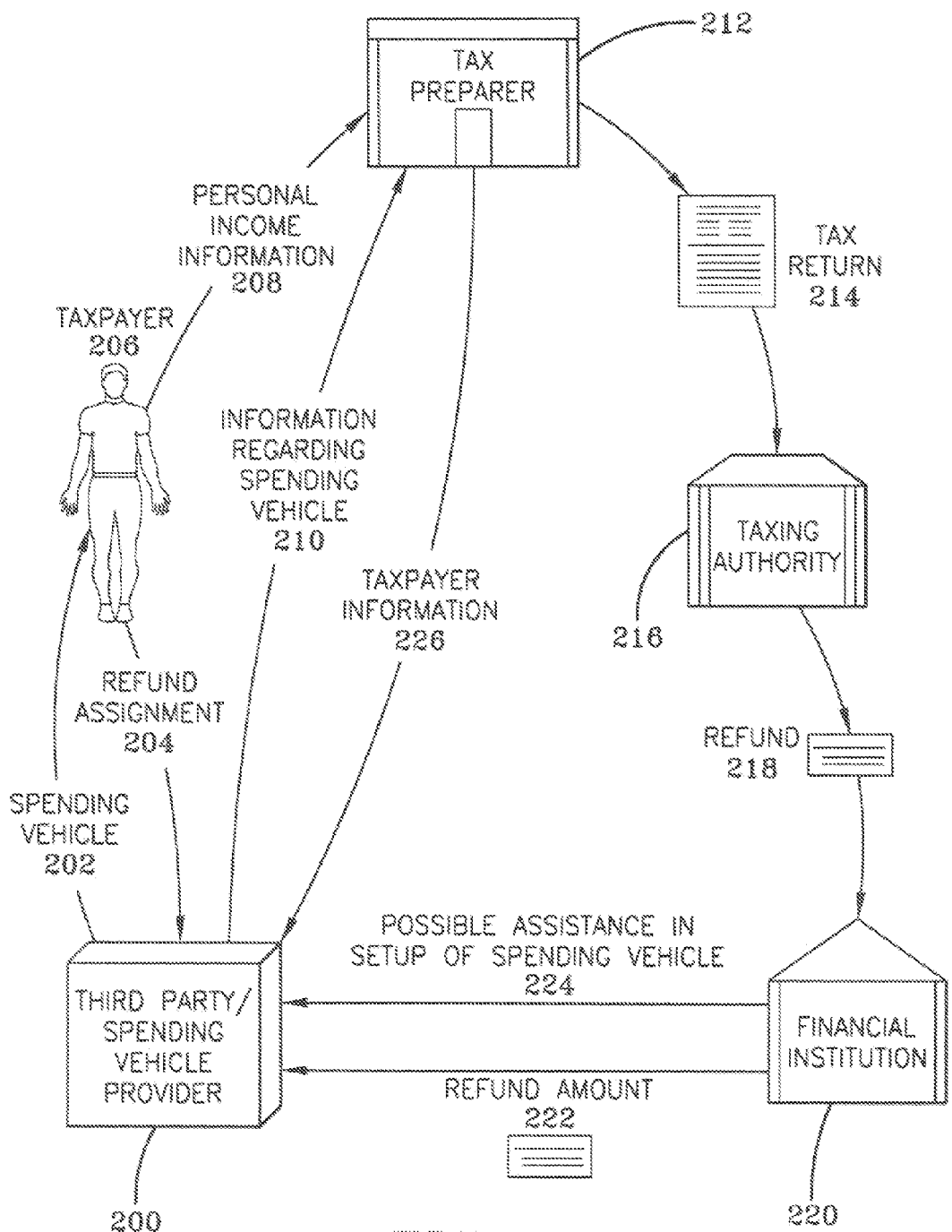
FIG. 2 is a schematic view of a preferred embodiment of the system of the present invention.

Referring now to the drawings, there is shown in FIG. 2 a preferred embodiment of the system of the present invention. The present invention is described with reference to the United States federal tax system and the IRS. However, the present invention has applicability to practically any tax system at the federal, state or local level in practically any country with a taxing authority.

Figure 1:
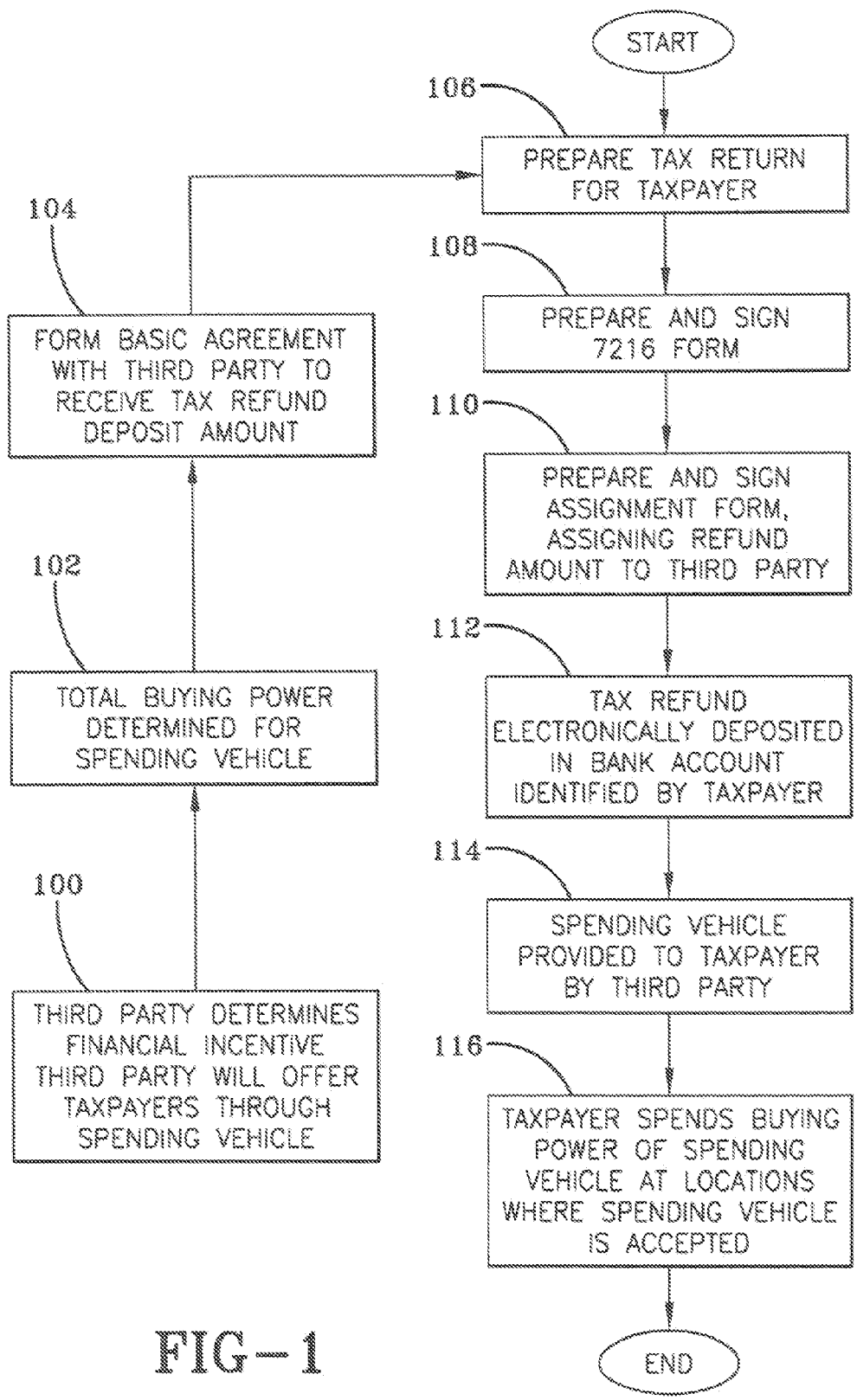
FIG. 1 is a flow diagram of a preferred embodiment of the present invention.

Steps to accomplish a preferred embodiment of the present invention are shown in FIG. 1. A third party determines a financial incentive it will offer to taxpayers through a spending vehicle 100. Next, the third party determines the total buying power for the spending vehicle 102. A basic agreement that allows the third party to receive a tax refund is created 104. A tax return is then prepared for the taxpayer 106. The taxpayer may prepare his or her own tax return or have it prepared by a third party preparer. The taxpayer signs a 7216 Form to allow the information on his or her tax return to be used by other parties 108. An assignment form is also signed so that the tax refund amount is assigned to the third party 110. The tax return is processed and the tax refund is electronically deposited in a bank account identified by the taxpayer 112. The spending vehicle is provided to the taxpayer by the third party 114. The taxpayer then spends the buying power of the spending vehicle at locations where it is accepted 116.

Referring to FIG. 2, a schematic view of a preferred embodiment of the system of the present invention is shown. A taxpayer 206 prepares his or her own tax return or has his or her tax return prepared by a third party preparer 212. Preparation of the tax return may be done in practically any way and still accomplish the present invention. Usually, tax returns are prepared manually or electronically. While having his or her tax return prepared the taxpayer 206 may be asked whether he or she wishes to benefit from receipt of a spending vehicle 202 in exchange for assigning the amount of his or her tax refund amount 204 to another party 200. If the taxpayer 206 desires to receive the spending vehicle 202, then the taxpayer 206 may execute an assignment form 204 in which all or a portion of the tax refund amount paid to the taxpayer 206 is assigned to a third party 200 in exchange for the third party 200 agreeing to provide the taxpayer 206 with a spending vehicle 202. The taxpayer 206 may sign an IRC Section 7216 consent form or other consent to allow the information on his or her tax return 208 to be used by the tax preparation company 212 and/or the third party assignee of the tax refund deposit 200, to disclose information about the taxpayer 206 for completing the issuance of the spending vehicle 210.

In a preferred embodiment, once the tax returns 214 are completed for the taxpayer 206, they are filed electronically with the IRS 216. Certain information in the tax returns 226 is electronically provided to a financial institution 220 to assist in providing the spending vehicle to the taxpayer 224. Such information may include, but is not limited to, the taxpayer's name and address, social security number, as well as the tax refund amount claimed 222. Once the IRS 216 processes the taxpayer's tax return, the IRS 216 may send the refund amount 218 to the taxpayer's account at a financial institution 220 designated by the taxpayer 206 or at an agent 200 designated by the taxpayer 206 who provides the taxpayer 206 with a financial value through a financial vehicle 202 such as a credit card, debit card, e-wallet account, gift card, or any other type of spending vehicle which would enable the holder of the spending vehicle to purchase products or services.

In another embodiment of the present invention the IRS may provide its own spending vehicle to the taxpayer. In other words, the IRS may provide a spending vehicle to the taxpayer directly without need of an intermediate entity such as a financial institution. Likewise, the tax preparer company may not be necessary to make effective use of the present invention. For example, a taxpayer may file his or her own tax returns either by mail or electronically through the internet, for example, and, while doing so, execute an assignment of his or her tax refund payment to a third party who would in turn provide a spending vehicle to the taxpayer.

Under a preferred embodiment of the present invention, the spending vehicle provider may issue, for example, a debit card to a taxpayer upon receiving confirmation of the taxpayer's refund amount. The credit card or debit card may not be activated until such time as the spending vehicle provider receives the tax refund deposit amount. The spending vehicle may include a telephone number for a taxpayer to call to activate the spending vehicle once the spending vehicle provider is assured of receipt of the tax refund amount. Once the taxpayer's spending vehicle is activated, the taxpayer may spend the value of the spending vehicle. For example, a taxpayer who is entitled to receive a $450 tax refund amount may assign that amount to a spending vehicle provider in exchange for $500 of spending power through a debit card good only at a particular retailer or at some group of retailers. In another example, a taxpayer who is due a refund amount of $2,500 may assign his or her refund amount to an automobile dealer in exchange for the automobile dealer issuing a spending vehicle worth $3,000 in buying power at the auto dealership. In another example, a cruise line may offer a spending vehicle of $3,000 in exchange for receiving the taxpayer's refund amount of $2,250.

The spending vehicle may take the form of many different embodiments, including but not limited to, credit cards, debit cards, cash cards, spending accounts, electronic spending accounts, coupons, discount certificates, rebate certificates, and any other vehicle in which a taxpayer receives spending power in a particular dollar amount useable at practically any participating retailer, financial institution, service provider, wholesaler, distributor, manufacturer, entertainment entity, and any participating entity through which a taxpayer may purchase something of value to the taxpayer. A tax return may be any means by which tax information is gathered. For example, and not by limitation, a paper form may be used, or an electronic form may be used, or a form per se (as may be defined as a predetermined list of questions to be responded to) may not be needed, rather a collection of tax information accomplished in any manner is all the data collection that is necessary to invoke the present invention. Another example of an acceptable collection of information (i.e., tax return) is collecting the information telephonically by the taxpayer calling a particular telephone number and speaking answers (or answering by pushing buttons on a touch-tone phone) to questions posed by a live operator or posed by an automated interactive voice response (IVR) system.

Figure 3:
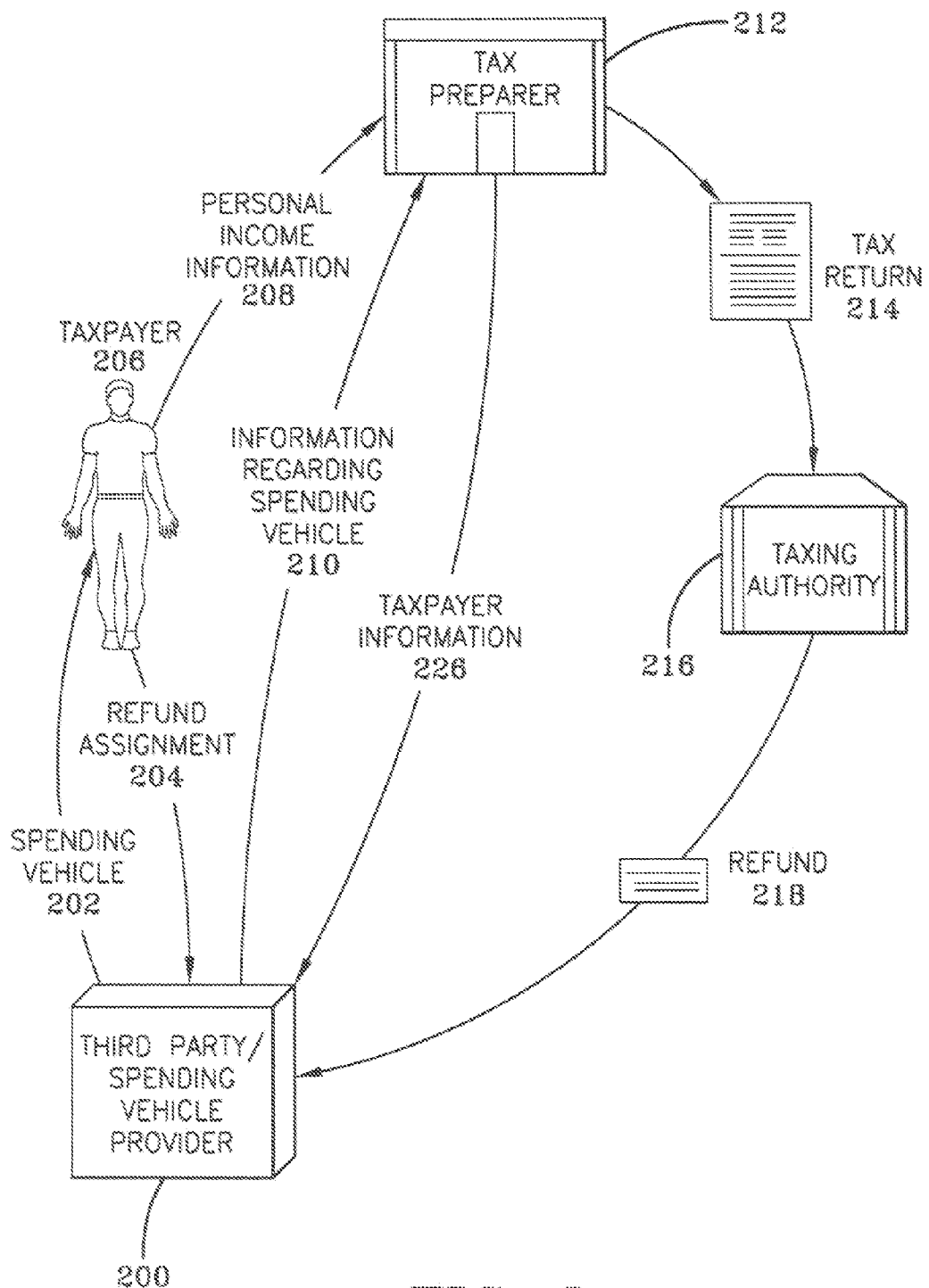
FIG. 3 is a schematic view of another preferred embodiment of the system of the present invention; and, FIG. 4 is a schematic view of yet another preferred embodiment of the system of the present invention.
Figure 4:
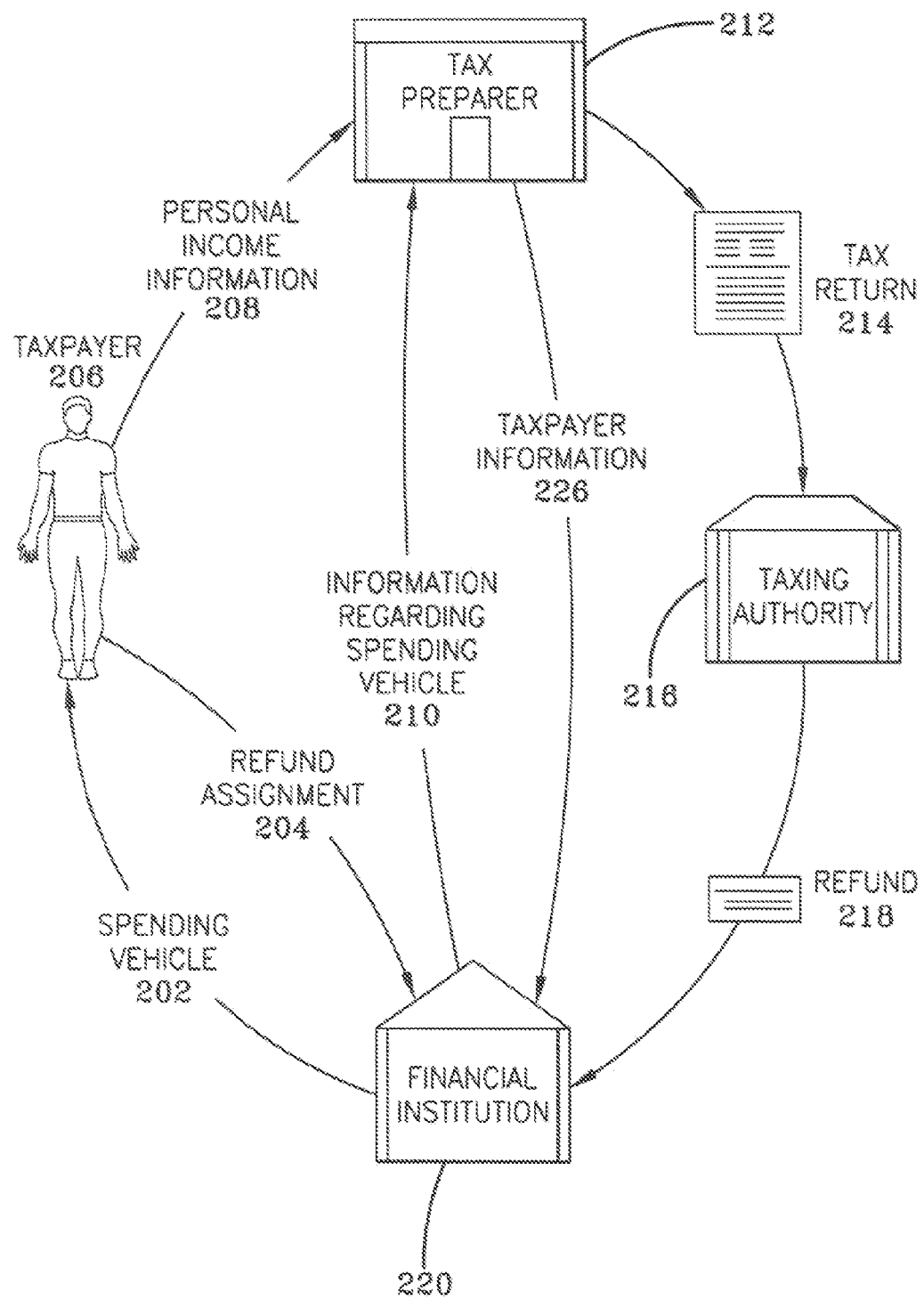

Use of a financial institution as a middleman between the taxpayer, the IRS, and the spending vehicle provider may be preferable. For example, financial institutions are typically well established in providing spending vehicles such as credit cards and debit cards. A retailer, for example, may find it helpful to provide its own spending vehicle if done in conjunction with a financial institution. While financial institutions may be beneficial to the process of the present invention, they are not essential. Since the IRS may send tax refund amounts to a bank account established by or for the taxpayer, a spending vehicle provider may find it advantageous to work through that financial account rather than attempt to receive the tax refund amount through other avenues. FIG. 3 shows another embodiment of the present invention in which a financial institution is not involved in issuing a spending vehicle, rather a retailer 200, for example, prepares its own spending vehicle 202. FIG. 4 shows another embodiment of the present invention in which a particular third party spending vehicle provider is not necessary, rather a financial institution 220 (perhaps the bank where the taxpayer banks), for example, issues a spending vehicle 202 directly to the taxpayer 206 that may be used at many different outlets for the purchase of goods and or services.

Once the taxpayer receives the spending vehicle and the spending vehicle has been activated, the taxpayer may spend the dollar amount of value inherent in that taxpayer's spending vehicle through participating sales outlets. Furthermore, the spending vehicle provider may agree to assign its rights and obligations in the spending vehicle to another entity at which the taxpayer may spend or obtain the unspent dollar amount of the spending vehicle.

A tax preparation company may also benefit from the present invention in a number of different ways. In a preferred embodiment of the present invention the tax preparation company may receive a small percentage of the dollar amount of sales generated by the spending vehicle. The tax preparation company may also benefit by extra business in tax preparation from taxpayers interested in receiving the benefits of the present invention. In another embodiment of the present invention the tax preparation company may receive a participation fee from goods and services providers who desire to be a part of the system of the present invention.

The tax preparation and/or electronic tax filing fee charged by a tax preparation company may be paid through an assignment of a portion of the refund amount by the taxpayer. For example, in a situation where a taxpayer is due a $1,000 refund, a portion of that amount may be allocated to the tax preparation company for preparing the tax returns and filing them, and the remaining portion of the account may be directed to a spending vehicle provider for providing a spending vehicle to the taxpayer. Alternatively, the taxpayer may pay the tax preparation company directly at the time of the preparation and/or electronic tax filing of the tax return forms.

Once the spending vehicle is activated for the taxpayer, in a preferred embodiment of the present invention, the taxpayer may be given a period of time in which to use the spending vehicle before a service charge is applied. For example, the taxpayer may incur no service charge on the spending vehicle if the spending vehicle is used within 90 days of being activated. In the event a minimum balance remains in the spending vehicle after the initial "no fee" period, a small monthly service charge may be levied against the spending vehicle until it is entirely used. Alternatively, after a period of time (e.g., 60 days) the spending vehicle provider may issue a check to the taxpayer for the balance left in the spending vehicle.

Having shown and described a preferred embodiment of the present invention, those skilled in the art will realize that many variations and modifications may be made to the described invention and still be within the scope of the claimed invention. Thus many of the elements indicated above may be altered or replaced by different elements which will provide the same or substantially the same result and fall within the spirit of the claimed invention. It is the intention therefore to limit the invention only as indicated by the scope of the claims.

The invention claimed is:

1. A computerized method for providing a tax refund to a taxpayer comprising:
    preparing at a computer an electronic tax return for a taxpayer;
    determining from said electronic tax return for said taxpayer a tax refund from a taxing authority;
    offering said taxpayer an option of receiving at least a portion of said tax refund on a spending vehicle, said spending vehicle provided by a financial institution that agrees:
    (a) to accept an assignment of right entitling said financial institution to retain said at least a portion of said tax refund;
    (b) to issue said spending vehicle to said taxpayer in exchange for said assignment of right; and
    (c) to issue said spending vehicle in an amount greater than said at least a portion of said tax refund assigned to said financial institution;
    receiving from said taxpayer an assignment of right allocating said at least a portion of said tax refund to said financial institution and entitling said financial institution rather than said taxpayer to receive and retain said at least a portion of said tax refund in exchange for issuing said spending vehicle and wherein said assignment does not further comprise a loan agreement between said taxpayer and said financial institution wherein said loan agreement is subject to regulatory banking laws;
    electronically filing with said taxing authority said electronic tax return for said taxpayer;
    receiving at a third party computer from said taxing authority assurance that said tax refund is forthcoming; and
    transmitting electronically from said third party computer to a computer at said financial institution information to assist in issuing said spending vehicle to said taxpayer.

2. The computerized method of claim 1 wherein receiving from said taxing authority assurance that said tax refund is forthcoming comprises receiving from said taxing authority said tax refund.

3. The computerized method of claim 1 wherein said spending vehicle is selected from the group consisting of a debit card, a cash card, a gift card, an e-wallet account, a spending account, a coupon, a discount certificate, and rebate certificate.

4. The computerized method of claim 1 wherein preparing a tax return for a taxpayer comprises using a commercially available software package.

5. The computerized method of claim 1 wherein preparing a tax return for a taxpayer comprises using a tax preparation company to prepare a tax return for said taxpayer.

6. The computerized method of claim 5 further comprising deducting tax return preparation fees from said tax refund when said tax refund is received from said taxing authority.

7. A computerized system for providing a tax refund to a taxpayer comprising:
    tax preparation software executing at a computer for preparing a tax return for a taxpayer;
    tax return data from said tax preparation software executing at said computer, said tax return data comprising a tax refund amount for said taxpayer;
    spending vehicle selection data at said computer related to said taxpayer's acceptance of an option to receive at least a portion of said tax refund amount on a spending vehicle provided by a financial institution that agrees to accept an assignment of rights allocating said at least a portion of said tax refund to said financial institution rather than said taxpayer and to issue said spending vehicle to said taxpayer in an amount greater than said at least a portion of said tax refund amount in exchange for said assignment;
    an assignment of rights from said taxpayer allocating at least a portion of said tax refund amount to said financial institution and entitling said financial institution rather than said taxpayer to receive and retain said at least a portion of said tax refund in exchange for issuing said spending vehicle wherein said assignment does not comprise a loan agreement between said taxpayer and said financial institution wherein said loan agreement is subject to regulatory banking laws;
    filed tax return data comprising an assurance from said taxing authority that said tax refund is forthcoming; and
    electronic tax return information provided electronically to said financial institution to assist said financial institution in issuing a spending vehicle to said taxpayer according to said spending vehicle selection data and said assignment.

8. The computerized system of claim 7 wherein said assurance that said tax refund is forthcoming comprises receipt of said tax refund from said taxing authority.

9. The computerized system of claim 7 wherein said spending vehicle is selected from the group consisting of a debit card, a cash card, a gift card, an e-wallet account, a spending account, a coupon, a discount certificate, and rebate certificate.

10. The computerized system of claim 7 wherein said tax preparation software is a commercially available software package.

11. The computerized system of claim 7 wherein said tax preparation software is used by a tax preparation company to prepare a tax return for said taxpayer.

12. The computerized system of claim 11 further comprising tax return preparation fees deducted from said tax refund when said tax refund is received from said taxing authority.

13. A computerized system for providing a tax refund to a taxpayer comprising:
   tax return data at a computerized system for a taxpayer, said tax return data comprising a tax refund amount for said taxpayer;
   a spending vehicle selected by said taxpayer, said spending vehicle provided to said taxpayer by a third party that agrees to accept from said taxpayer only a right to receive a deposited tax refund in at least a portion of said tax refund amount and to issue said spending vehicle to said taxpayer in an amount greater than said at least a portion of said tax refund amount and only in exchange for a right to receive said deposited tax refund;
   an assignment from said taxpayer evidencing said right of said third party to receive only a deposited tax refund in exchange for said spending vehicle wherein said assignment of right:
   (1) entitles said third party to receive and retain said deposited tax refund rather than said taxpayer; and
   (2) does not comprise a loan agreement with a lending institution that is subject to regulatory banking laws;
   a deposited tax refund received and retained by said third party rather than said taxpayer; and
   electronic tax return information provided from said computerized system to a computer for said third party to assist in issuing a spending vehicle to said taxpayer according to said assignment between taxpayer and said third party.

14. The computerized system of claim 13 wherein said third party is a provider of said spending vehicle.

15. The computerized system of claim 13 wherein said third party is a financial institution that issues said spending vehicle to said taxpayer on behalf of a spending vehicle provider.

16. The computerized system of claim 13 wherein said spending vehicle is selected from the group consisting of a debit card, a cash card, a gift card, an e-wallet account, a spending account, a coupon, a discount certificate, and rebate certificate.

17. The computerized system of claim 13 wherein said tax return data is from a commercially available software package that said taxpayer uses to prepare a tax return.

18. The computerized system of claim 13 wherein said tax return data is from a tax preparation company that prepares a tax return for said taxpayer.

19. The computerized system of claim 13 further comprising tax return preparation fees deducted from said deposited tax refund.

* * * * *

UNITED STATES PATENT AND TRADEMARK OFFICE
CERTIFICATE OF CORRECTION

PATENT NO.         : 7,765,132 B2
APPLICATION NO.    : 11/626677
DATED              : July 27, 2010
INVENTOR(S)        : Wilson et al.

Page 1 of 1

It is certified that error appears in the above-identified patent and that said Letters Patent is hereby corrected as shown below:

On the title page, section (74), Attorney, Agent, or Firm, please delete "Stanley Law Group LLP" and insert --Standley Law Group LLP--

Signed and Sealed this
First Day of March, 2011

David J. Kappos
*Director of the United States Patent and Trademark Office*